Patented July 29, 1952

2,605,242

UNITED STATES PATENT OFFICE 2,605,242

HIGH SOLIDS CONTENT, LOW VISCOSITY BUTADIENE - STYRENE COPOLYMER LATEX FOR EMULSION PAINT BASE

Joseph L. Betts, Jr., Edward A. McCracken, Harold J. Rose, and Robert E. Wood, Baton Rouge, La., assignors to Standard Oil Development Company, a corporation of Delaware No Drawing. Application July 13, 1951, Serial No. 236,698

10 Claims. (Cl. 260—8)

This invention relates to an improvement in high polymer latices. In particular, this invention relates to the production of rubbery to resinous butadiene copolymer latices suitable for use as an emulsion paint base, that is, to latices having low viscosity at high solids content, high resistance to chemical and mechanical coagulating effects, and good film forming properties.

The preparation of rubber-like and resinous diolefin polymers and copolymers in emulsion form has been practiced commercially for considerably more than a decade. However, the latices resulting from such conventional polymerization processes generally tended to have a high viscosity at high solids contents, which precluded their use in paper coating, emulsion paint compositions, and the like. Moreover, the prior art latices in general have been deficient in certain respects, particularly for emulsion paints, e. g. insufficient stability to permit loading with pigments to the extent required in coating compositions and insufficient bodying.

It has now been discovered that synthetic latices of improved characteristics for use in paint compositions can be readily synthesized when the emulsifiers heretofore used in conventional polymerization recipes are replaced by a special combination of ionic and non-ionic emulsifiers, and an electrolyte.

The basic concept of the present invention is applicable to the preparation of high molecular weight, rubber-like to resinous copolymers from a mixture of monomers containing 0–100 weight percent of a conjugated diolefin of 4 to 6 carbon atoms such as butadiene, isoprene or 2,3-dimethylbutadiene-1,3 and 100 to 0 weight percent of a copolymerizable monoethylenically unsaturated compound such as acrylonitrile or styrene and their homologues, e. g. methacrylonitrile and p-methyl styrene. Mixtures of monomers of each of the aforesaid classes can also be used in place of individual compounds. Polymer latices possessing an especially favorable balance of properties can be obtained from monomer feeds containing about 80 to 40 percent of butadiene-1,3 and 20 to 60 percent of styrene as well as from feeds containing 55 to 85 percent butadiene and 45 to 15 parts of acrylonitrile.

In a manner conventional in emulsion polymerization 1 part of the monomers is emulsified in 0.5 to 3 parts by weight of an aqueous medium, the preferred weight ratio being 1 part of monomers per 1 to 1.5 parts of water. The emulsifier combination and electrolyte used in preparing the emulsion represents the real essence of the present invention and will be described in detail hereafter.

The emulsified reaction mixture also contains about 0.1 to 3 weight percent, or preferably 0.2 to 0.5 weight percent (based on monomers) of a per-type or oxidizing catalyst exemplified by persulfates or perborates of sodium, potassium or of ammonium. For economical reasons, potassium persulfate is used most commonly. Alternatively, peroxides such as hydrogen peroxide, benzoyl peroxide, cumene hydroperoxide, di-ter-butyl peroxide or hydroperoxide can be used also. The system may also be activated by auxiliary reducing agents such as dextrose commonly used in polymerizations based on recipes of the so-called redox type.

Finally, it is also desirable to have present in the reaction mixture a polymerization modifier such as an aliphatic mercaptan having six or preferably eight to eighteen carbon atoms per molecule, e. g. dodecyl mercaptan, tri-isobutylene mercaptan, or Lorol mercaptan, which is a mixture of primary $C_{10}$ to $C_{18}$ mercaptans derived from cocoanut oil and containing a predominant proportion of lauryl mercaptan. Other mercaptans such as n-hexyl, t-octyl, n-octadecyl are also useful.

Alternatively, known modifiers such as diisopropyl xanthogen disulfide, carbon disulfide, carbon tetrachloride and the like can be used likewise. The amount of modifier used is preferably between about 0.2–2%, the principal object thereof being to maintain the Mooney viscosity of the polymeric product, after coagulation and drying, in the range of about 40 to 200. The specific optimum proportions of all the various ingredients of the reaction mixture depend on several factors such as type and proportion of monomers, modifier, water ratio and reaction temperature as is well known to persons skilled in the art.

The reaction mixture is agitated within a closed reactor maintained at temperatures of 0° C. to 100° C., preferably 50 to 85° C., until 50% or preferably 90 to 100% conversion of monomers is obtained. Substantially complete conversion of monomers is desirable as it greatly facilitates economic operation in avoiding complications otherwise arising from monomer recovery and recycling. Depending on the particular combinations of ingredients and conditions employed, the required reaction time may range from about 5 to 60 hours, preferably about 12 to 24 hours.

Buffers may be added to hold pH at a desired level, for example 0.2 to 1.0 part per 100 parts of monomers of sodium bicarbonate can be used. Activators may be used to accelerate reaction, for example, 0.1 to 0.3 part of morpholine, or 0.005 to 0.02 part sodium cyanide, or a mixture prepared by heating the potassium persulfate catalyst with potassium ferricyanide. For instance, 160 cc. of 6 percent $K_2S_2O_8$ solution are mixed with 40 cc. of 6 percent $K_3Fe(CN)_6$ and heated 2 hours at 122° F. This solution is used in an amount corresponding to 0.475 part $K_2S_2O_8$ and 0.12 part $K_3Fe(CN)_6$ per 100 parts of monomers.

Crosslinking agents, for example, 0.1 to 1.0 percent of divinyl benzene (based on monomers), may be used to give harder, more resinous polymers.

At the end of the polymerization the reactor is vented. It is not necessary to add a short-stopping agent or antioxidant but, if desired, agents such as hydroquinone, phenyl betanaphthylamine, ditertiary butyl cresol, 2,2-diphenylolpropane, hydroxylamine hydrochloride, and/or other customary ingredients may then be added to the latex. Where conversion is incomplete, stripping to remove residual styrene is desirable to improve odor and make the latex more suitable for use in emulsion paints. Before stripping it is desirable to adjust latex pH to 9–11 to minimize coagulation during stripping.

The resulting latex is then ready for formulation as a paint emulsion. For instance, a typical paint may be formulated as follows:

| | Parts by weight |
|---|---|
| Latex [1] | 50 |
| Titanium dioxide (pigment) | 20 |
| Lithopone (pigment extender) | 6 |
| Mica (pigment extender) | 3 |
| Tetrasodium pyrophosphate [2] | 0.15 |
| Moncethanolamine oleate [3] | 0.15 |
| Alpha protein | 1 |
| Casein (protective colloid) | 2 |
| Ammonium hydroxide (26° Bé.) | 0.2 |
| Sodium pentachlorophenate (preservative) | 0.35 |
| Pine oil (anti-foam agent) | 0.3 |
| Additional water (diluent) | 20 |
| Total | 103.15 |

Total solids about 50%.

[1] Copolymer of 80% butadiene-20% styrene, 40% polymers solids in water (equivalent to about 20% polymer solids in total formula).
[2] Prevents pigment agglomeration.
[3] 50% ethanol solution (wetting agent).

Of course, many variations can be made in the above formula as will be apparent to those skilled in the art. For example, while a latex having a solid polymer content of at least 35 to 60% is desirable for economic reasons, it is entirely practical to use a latex having a polymer content as low as about 20 or 30%, in which case no further water need be added during the paint formulation. Likewise, it is obvious that the particular paint ingredients have been listed above merely for the purpose of illustration, and that other known pigments, wetting agents, protective colloids, and so on may be used and that the concentrations thereof may be varied within fairly wide and readily determinable limits.

The real essence of the present invention lies in the discovery that the use of only a very narrow combination of special types of emulsifiers permits the use of a sufficient amount of electrolyte in the latex synthesis, which is required to obtain a latex having the desired particle size for fluidity and stability with regard to electrolytes and which otherwise meets the strict requirements of high solids content, stability with regard to organic solvents and to mechanical effects, as well as good film forming properties and preferably also substantially complete freedom from odor, all of which are essential in the formulation of commercial emulsion paints and of paper coatings. In addition to the above features, this invention has the additional special feature that it gives emulsion paints of good bodying or flow characteristics, meaning easy to brush but does not run or sag after application. With most conventional systems, the required amount of electrolyte cannot be tolerated because it either causes coagulation during synthesis or poisons the reaction.

In particular this invention requires, firstly, the use of a particular ionic organic emulsifier, namely an alkali metal resinate. Suitable materials include the sodium or potassium soaps of rosin acids. Crude wood rosin acids should be treated to remove two types of harmful materials, namely, the abietic-type acids and phenolic inhibitors. Either hydrogenation or dehydrogenation or hydrogen-exchange of abietic acid converts it to materials which are satisfactory as polymerization emulsifiers. One way of doing this is to cause a disproportionation reaction with a palladium catalyst. This treatment effects a hydrogen-exchange, by which some of the abietic acid is converted by hydrogenation into dihydroabietic acid and tetrahydroabietic acid, and some also converted simultaneously by dehydrogenation to dehydroabietic acid. The resulting product, containing a mixture of these several products, is a much better polymerization emulsifier than the untreated rosin acids containing substantial proportions of abietic acid.

The resulting disproportionated wood rosin acid product should then be subjected to some refining treatment to remove phenolic inhibitors. Suitable methods include contacting with an adsorbent earth or filtering through such material, distillation, crystallization, and solvent extraction.

A suitably refined disproportionated rosin acid sodium soap, substantially free from phenolic inhibitors, is available commercially on the market under the trade name "Dresinate 731." "Dresinates," marketed by Hercules Powder Co., are said to contain 60–70% solids; "Dresinate 731" is said to have 64% solids, and an iodine number of 11.

The preparation, purification, and use of such a product as an emulsifier of GR-S type (i. e. butadiene-styrene) synthetic rubber, are described in the literature (see Industrial and Engineering Chemistry, vol. 39, page 1129 (1947), and vol. 41, page 1626 (1949).

Instead of using the above described preferred refined disproportionated rosin acid soap, one may also use corresponding sodium or other monovalent basic ion soaps of hydrogenated rosin acids, or of the relatively pure individual rosin acids or their derivatives, which form emulsifiers which do not retard or inhibit polymerization, but preferably promote such polymerization. For instance, one may use dihydroabietic acid, tetrahydroabietic acid, dextropimaric acid, and, although not as good, isodextropimaric acid. Of these individual materials, the tetrahydroabietic acid is best. One may also use substantially pure dihydroabietic acid. Mixtures of these pure materials may also be used. The essential requirement is that the rosin acids to be used be substantially free from abietic acid, neoabietic acid, and levopimaric acid, all of which act as retarders or inhibitors of polymerization when used as emulsifying soaps. This particular type of ionic emulsifier not only gives proper emulsification, polymerization and stability, but also gives a very unobvious improvement in bodying characteristics when later formulated into a paint composition, particularly upon addition of the alpha protein and other constituents of the finished composition.

Secondly, a non-ionic emulsifier of the polyether alcohol type is required. In this class, the alkylated aryl polyether alcohols are obtained, as is well known, by condensation of an alkyl phenol of six to ten, or preferably seven to nine carbon atoms in the alkyl group with about six to twelve, or preferably seven to ten molecules of ethylene oxide. The resulting condensation products which may be mixtures of individual compounds, have the formula:

$$RC_6H_4(OCH_2CH_2)_nOH$$

wherein R is an alkyl radical of 6 to 10 carbon atoms and $n$ is an integer ranging from 6 to 30 inclusive, preferably 7 to 10. Alkyl phenols useful in the preparation of these emulsifiers include hexyl phenol, octyl phenol, decyl phenol and dodecyl phenol, the octyl phenol known as diisobutylene phenol being particularly preferred. Commercial alkaryl polyether alcohol emulsifiers which have been found useful in connection with the present invention include "Triton X-100," "Glim" and "Antarox A-210."

Thirdly, the process of the invention requires a small amount of an electrolyte such as sodium sulfate, the function of the electrolyte being to assure a relatively large size of the latex particles and thus to keep the viscosity of the latex at a minimum without making the dispersion unduly unstable. Water-soluble salts having a monovalent cation and a mineral acid anion, such as sodium chloride, sodium sulfate and sodium pyrophosphate are the preferred electrolytes. However, given the concept of the present invention, the optimum concentration of any particular electrolyte within the range disclosed below, can be determined in a routine fashion. In general, the electrolyte concentration which gives fluid, large particle latices of good stability lies just below the amount which inhibits the polymerization reaction to an extent making substantially complete conversion of monomers impractical.

As indicated above in the tabulated example of a paint formulation, one or more proteins may be used. Casein is a suitable material, and this is available commercially as a by-product in the dairy industry. Vegetable proteins may also be used, such as soybean protein, or preferably alpha protein which is a fraction recovered from the crude soybean protein. Other animal and vegetable proteins may be used, as well as mixtures of any two or more of these, or fractions thereof, for instance separated according to molecular weight, solubility in water or other solvents, or according to other physical or chemical characteristics, particularly for the purpose of serving as a protective colloid to maintain the polymer emulsion or latex and other ingredients of the paint formulation in a stable condition of controlled dispersion.

An important feature of the present invention is to prepare a synthetic styrene-diene latex paint composition having controlled bodying characteristics within certain particular limits. A suitable bodying test is to measure the Ford cup viscosity, which for purposes of the present invention should be about 40 to 80, preferably about 60 to 70 seconds at 77° F. (25° C.). The constituents of the latex paint composition of this invention cooperate, in some manner not yet understood, to produce compositions having these desired bodying characteristics, whereas prior art products made with somewhat similar but slightly different formulations, gave unsatisfactorily low viscosities in the range of 10 to 20.

The critical concentrations of the various constituents necessary for the accomplishment of the present invention, when using purified rosin acid sodium soap as the ionic polymerization emulsifier and sodium sulfate as the electrolyte are as follows: 1 to 10 weight per cent, preferably 2 to 5 weight percent of non-ionic emulsifier (based on total monomers); 1 to 10 weight percent, preferably 2 to 5 weight percent of ionic emulsifier (based on total monomers); and 0.1 to 3.0 weight percent, preferably 0.3 to 2.0 weight percent of electrolyte (based on total monomers).

In addition to the above mentioned overall proportions of the several constituents, it is also desirable to maintain a certain general relation of the proportions of ionic and non-ionic emulsifiers to each other. In general, the amount of ionic emulsifier, i. e. rosin acid soap, should be about 50–200%, preferably about 60–150%, of the weight of the non-ionic emulsifier, i. e. the polyether alcohol. The purpose of maintaining this relationship is to obtain the proper balance of paint mix viscosity and latex characteristics such as particle size and mechanical stability.

Although one tabulated example has already been given above to show the various pigment ingredients, protein solution and thickener solution which should be mixed with the synthetic latex to make a finished paint formulation, another is given herewith as a further example, of a white semi-gloss emulsion paint:

| Ingredients | Percent Weight |
|---|---|
| Pigment Dispersion: | |
| Titanium Dioxide (Rutile) | 21.00 |
| Lithopone | 6.00 |
| Mica | 3.00 |
| Water | 10.00 |
| Wetting Agent | 0.07 |
| Tetrasodium Pyrophosphate | 0.15 |
| Soy Bean Protein Solution: | |
| Soy Bean Protein | 1.90 |
| Water | 10.26 |
| NH₄OH (26° Bé.) | 0.19 |
| Sodium Pentachlorphenate Solution (20%) | 0.32 |
| Thickener Solution: | |
| Ammonium Alginate | 0.10 |
| Water | 4.87 |
| Sodium Pentachlorphenate Soln. (20%) | 0.03 |
| Latex: | |
| Latex Solids | 18.0 |
| Latex Liquids + Added Water | 24.11 |
| Total | 100.00 |

Total solids _____ 50.29%
Weight per gallon _____ 10.75
Pigmentation _____ 70/20/10:TiO₂/lithopone/mica The invention is further illustrated by the test runs described below. In these test runs, as in all other portions of this specification, every reference to quantities in terms of "parts" shall be understood as meaning "parts by weight per 100 parts of monomers," unless the context indicates otherwise.

*Test runs 1–7*

In a number of polymerization tests, 400 grams of monomers were charged to 2-liter stainless steel pressure bottles along with other ingredients for emulsion polymerization as shown in Table I. The bottles were strapped in a radial position to a wheel rotating at 19 R. P. M. in a bath which was maintained at the desired temperature as indicated. In every case, unless otherwise noted, the following synthesis recipe was used:

| | Parts by weight [1] |
|---|---|
| Butadiene | 40 |
| Styrene | 60 |
| Water | 130 |
| Modifier (t-dodecyl mercaptan) | 0.3 |
| Catalyst ($K_2S_2O_8$) | 0.3 |
| Emulsifier | As indicated |
| Other additives | As indicated |

[1] All charges made as parts by weight based on 100 parts of monomers.

Ordinarily the pH of the latex final product was raised to about 9.5 with caustic before evaluation tests.

Test runs 1–7 show the use of the materials of this invention and run A is given for comparison to show the best prior results obtained by a related invention disclosed in application 179,648.

The latex and finished paint mix evaluations are also shown in Table I.

Run 4, which is quite similar to run 1 but has the sodium sulfate increased from 0.9 to 1.0 parts, gave a latex unstable to storage. It showed a 7.9% coagulation in the mechanical stability test.

Run 5 shows that lowering the total emulsifier charge from 5 to 4 parts is not as suitable for commercial operation, because it required a longer reaction time (i. e. 42 hours compared to 20–23 hours), and also showed excessive coagulation in the mechanical stability test.

Run 6 shows that the ratio of the polyether alcohol to the rosin acid soap is critical for good paint viscosity. Generally, it is desirable that the amount of metal rosin acid soap emulsifier be about 50–200% of the weight of the non-ionic emulsifier, i. e. a polyether alcohol, whereas in run 6 the amount of rosin acid soap was outside that range.

Run 7, particularly when compared to run 2, shows that with a slightly higher sodium sulfate content and longer reaction time, the resulting product does not have as good mechanical stability nor as good paint mix viscosity.

If desired, the procedure of adding the various ingredients may be varied somewhat. For instance, one may withhold a portion of the non-ionic emulsifier prior to the emulsification and

Table I

| Run | A | 1 | 2 | 3 | 4 | 5 | 6 | 7 |
|---|---|---|---|---|---|---|---|---|
| Emulsifiers [1]: | | | | | | | | |
| Polyether alcohol | 5 | 2 | 3 | 2 | 2 | 2 | 4 | 3 |
| Rosin acid soap | | 3 | 2 | | 3 | 2 | 1.5 | 2 |
| Sodium Oleate | 0.25 | | | 3 | | | | |
| Alkaryl sulfonate | 1.0 | | | | | | | |
| Sodium sulfate | | 0.9 | 0.5 | 2.0 | 1.0 | 1.0 | 0.45 | 0.6 |
| Reaction Time, Hrs. at 160° F. (71° C.) | 15–20 | 22 | 23 | 20 | 23 | 42 | 25 | 42 |
| Conversion, percent | 100 | 100 | 100 | 98 | 100 | 100 | 92 | 90 |
| Latex Evaluations: | | | | | | | | |
| Particle size [2] | 93 | 115 | 120 | 180 | [5] 120 | [5] 110 | 130 | 110 |
| Mechanical stability, percent coag. [3] | 0.05 | 0.09 | Trace | [6] | 7.9 | 9.7 | Trace | 24 |
| Paint Mix Viscosity [4] | 13 | >80 | 58 | | >80 | | 18 | 16.5 |

[1] Emulsifiers:
The "Polyether alcohol" was "Triton X-100," a commercial alkylated aryl polyether alcohol.
The "Rosin acid soap" was "Dresinate-731," a commercial refined disproportionated rosin acid sodium soap.
The "Alkaryl sulfonate" was "Nekal BX," a commercial mixture containing 60–70% isobutyl naphthalene sodium sulfonate, and 30–40% sodium sulfate.
[2] Relative particle size expressed as percent light transmission measured by photelometer at 0.11% solids. An emulsion considered desirable was assigned 100% transmission; larger values indicate smaller particle size.
[3] 200 cc. latex stirred with Hamilton Beach "Drinkmaster" on low speed with single impeller. Percent coagulate determined by filtering through 150 mesh screen after 30 min. agitation.
[4] Ford cup viscosity in seconds (77° F. (25° C.) using:
Paint Mix—
Paint base mix, 100 gms.
Latex plus water, 67.5 gms.
Latex solids, 30.4 gms.
[5] Fine coagulate appeared in latex on standing.
[6] Complete coagulation after 2.5 minutes agitation.

In the above table I, run A represents a commercial composition made according to applicants' prior application 179,648. This product was considered quite satisfactory in many respects, but was too low in bodying characteristics, as indicated by the relatively low paint mix viscosity of 13. It is desirable that this viscosity be from about 40 to 80 or 90, and preferably about 60 to 70.

In the above Table I, runs 1 and 2 represent the best embodiments of this invention, in that they not only show a latex of suitable particle size and of good mechanical stability (less than 0.5% coagulation), but also show excellent bodying characteristics, i. e. paint mix viscosity in the range of about 80 to 58.

Run 3, which does not represent the present invention, shows that replacing the rosin acid soap emulsifier of the present invention with sodium oleate, as has been used in the prior art, gives a latex of poor mechanical stability.

polymerization, and add the withheld portion after the polymerization has been completed; or, alternatively, one may add the previously recommended amount of non-ionic emulsifier prior to polymerization, and add from 5 to 50% by weight thereof after polymerization. This procedure tends to give improved mechanical stability.

From the above description and data, it is apparent that the present invention provides the much-to-be-desired improvement in bodying characteristics.

In the appended claims, it is intended to claim all novelty inherent in the invention, as well as all modifications coming within the scope and spirit of the invention.

What is claimed is:

1. A polymerization process for the preparation of a fluid, coagulation resistant latex having a high concentration of solid polymer particles which comprises dispersing 100 parts of a polymerizable feed containing a conjugated diolefin of 4 to 6 carbon atoms in an aqueous medium in the presence of 1 to 10 parts of an alkylated aryl polyether alcohol as a non-ionic emulsifier, 1 to 10 parts of a rosin acid metal soap as an ionic emulsifier, and an electrolyte in a concentration just below the amount which poisons polymerization, and maintaining the resulting dispersion at a temperature between 0° C. and 100° C. in the presence of an oxygen-yielding polymerization catalyst until a polymer latex is produced.

2. A polymerization process for the preparation of a fluid, coagulation resistant latex of high solids content which comprises dispersing a monomer feed of 40 to 90 parts of butadiene-1,3 and 60 to 10 parts of a copolymerizable monoethylenically unsaturated compound in 50 to 300 parts of water in the presence of 2 to 5 parts of a non-ionic emulsifier having the formula

$$RAr(OCH_2CH_2)_nOH$$

wherein Ar is an aromatic hydrocarbon nucleus, R is an alkyl radical of 6 to 10 carbon atoms and $n$ is an integer ranging from 6 to 12, 2 to 5 parts of an ionic emulsifier consisting essentially of refined disproportionated rosin acid sodium soap, and a water soluble inorganic salt of a monovalent metal as electrolyte in a concentration just below the amount which poisons polymerization, and maintaining the resulting dispersion at a temperature between 50 and 85° C. in the presence of an oxygen-yielding catalyst until at least 90% conversion of monomers is obtained and a fluid latex having at least 30% polymer solids is produced.

3. A polymerization process for the preparation of a fluid, coagulation resistant latex of high solids content which comprises dispersing 40 to 85 parts of butadiene-1,3 and 60 to 15 parts of styrene in 100 to 150 parts of water with the aid of an emulsifier system consisting of 2 to 5 parts of a non-ionic emulsifier having the formula

$$RC_6H_4(OCH_2CH_2)_nOH$$

wherein R is an alkyl radical of 6 to 10 carbon atoms attached to a benzene ring and $n$ is an integer from 7 to 10, and 2 to 5 parts of ionic emulsifier consisting essentially of sodium soaps of rosin acids selected from the group consisting of tetrahydroabietic acid, dihydroabietic acid, dehydroabietic acid, dextropimaric acid, and isodextropimaric acid, and substantially free from abietic acid and phenolic polymerization inhibitors; and heating the resulting dispersion at a temperature between 60 and 80° C. in the further presence of 0.3 to 2.0 parts of a sodium salt of a strong polyvalent mineral acid, 0.2 to 2 parts of an aliphatic mercaptan of 8 to 14 carbon atoms and 0.2 to 0.5 part of potassium persulfate until at least 90% conversion of monomers is obtained.

4. A polymerization process for the preparation of a fluid, coagulation resistant latex of high solids content which comprises dispersing 40 to 50 parts of butadiene-1,3 and 60 to 50 parts of styrene in 100 to 150 parts of water with the aid of an emulsifier system consisting of 2 to 5 parts of an alkylated aryl polyether alcohol having the formula $RC_6H_4(OCH_2CH_2)_nOH$ wherein R is an octyl radical and $n$ is an integer from 7 to 10, and 2 to 5 parts of an ionic emulsifier consisting essentially of refined disproportionated rosin acid sodium soap; and heating the resulting dispersion at a temperature between 60 and 80° C. in the further presence of 0.3 to 2.0 parts of sodium sulfate, 0.2 to 0.5 part of a dodecyl mercaptan and 0.2 to 0.5 part of potassium persulfate until at least 90% conversion of monomers is obtained.

5. A process according to claim 4, wherein a further amount of about 1 to 2 parts of the polyether alcohol is mixed into the latex after termination of the polymerization in order to improve the mechanical stability of the latex.

6. A polymerization process for the preparation of a fluid, coagulation resistant latex which comprises dispersing 40 parts of butadiene-1,3 and 60 parts of styrene in about 130 parts of water with the aid of an emulsifier system consisting of about 2–3 parts of a polyether alcohol having the formula $RC_6H_4(OCH_2CH_2)_nOH$ wherein R is an octyl radical and $n$ is an integer from 7 to 10, about 3–2 parts of an ionic emulsifier consisting essentially of refined disproportionated rosin acid sodium soap; and heating the resulting dispersion at a temperature between 150 and 160° F. in the further presence of about 0.4–0.9 part of sodium sulfate, about 0.3 part of a dodecyl mercaptan until at least 90% conversion of monomers is obtained.

7. A latex of low viscosity and high coagulation resistance which comprises 100 parts of a copolymer of 40 to 90 percent of a conjugated diolefin of 4 to 6 carbon atoms and 60 to 10 percent of a copolymerized monoethylenically unsaturated substance, said copolymer being dispersed in 100 to 150 parts of water with the aid of an emulsifier system comprising 1 to 10 parts of an alkylated aryl polyether alcohol and 1 to 10 parts of a rosin acid metal soap as ionic emulsifier, the dispersion being further characterized by the presence of 0.1 to 1.2 parts of a water soluble salt of a monovalent metal as electrolyte.

8. A latex having a high coagulation resistance, which comprises 100 parts of a solid rubber-like copolymer of 40 to 60 percent of butadiene-1,3 and 60 to 40 percent of styrene, said copolymer being dispersed in 100 to 150 parts of water with the aid of an emulsifier system comprising 2 to 5 parts of an alkylated aryl polyether alcohol having the formula $RC_6H_4(OCH_2CH_2)_nOH$ wherein R is an octyl radical and $n$ is an integer from 7 to 10, and 2 to 5 parts of an ionic emulsifier consisting essentially of refined disproportionated rosin acid sodium soap, the latex dispersion being further characterized by the presence of 0.3 to 2.0 parts of sodium sulfate.

9. An emulsion paint composition comprising in percent by weight:

| | |
|---|---|
| Pigments | 25–35 |
| Protein | 1.5–2.5 |
| Thickener | 0.05–0.2 |
| Latex solids | 15–20 |
| Minor constituents | 0.5–2.0 |
| Water | balance | said latex solids consisting essentially of those defined in claim 7, and said total paint composition having a Ford cup viscosity of 40–90 seconds at 25° C.

10. A polymerization process for the preparation of a fluid, coagulation resistant latex of high solids content which comprises dispersing a monomer feed containing 40 to 100 parts of butadiene-1,3 and up to 60 parts of a copolymerizable monoethylenically unsaturated compound in 50 to 300 parts of water in the presence of 2 to 5 parts of a non-ionic emulsifier having the formula $RAr(OCH_2CH_2)_nOH$ wherein Ar is an aromatic hydrocarbon nucleus, R is an alkyl radical of 6 to 10 carbon atoms and $n$ is an integer ranging from 6 to 30, 2 to 5 parts of an ionic emulsifier consisting essentially of refined disproportionated rosin acid sodium soap, and a water soluble inorganic salt of a monovalent metal as electrolyte in a concentration just below the amount which poisons polymerization, and maintaining the resulting dispersion at a temperature between 50 and 85° C. in the presence of an oxygen-yielding catalyst until at least 90% conversion of monomers is obtained and a fluid latex having at least 30% polymer solids is produced.

JOSEPH L. BETTS, Jr.
EDWARD A. McCRACKEN.
HAROLD J. ROSE.
ROBERT E. WOOD.

No references cited.